(12) United States Patent
Griffin

(10) Patent No.: US 7,651,250 B2  
(45) Date of Patent: Jan. 26, 2010

(54) RETRACTABLE TELESCOPING LIGHTING DEVICE FOR ROOF OF A VEHICLE

(76) Inventor: James William Griffin, 96-108 Newlands Road, Reservoir, Victoria 3073 (AU)

( * ) Notice: Subject to any disclaimer, the term of this patent is extended or adjusted under 35 U.S.C. 154(b) by 422 days.

(21) Appl. No.: 10/505,649

(22) PCT Filed: Feb. 25, 2003

(86) PCT No.: PCT/AU03/00231

§ 371 (c)(1),  
(2), (4) Date: Oct. 5, 2004

(87) PCT Pub. No.: WO03/070515

PCT Pub. Date: Aug. 28, 2003

(65) Prior Publication Data

US 2006/0002122 A1    Jan. 5, 2006

(30) Foreign Application Priority Data

Feb. 25, 2002 (AU) .......................................... 0744

(51) Int. Cl.  
*B60Q 1/00* (2006.01)
(52) U.S. Cl. .................... 362/493; 362/285; 362/418; 362/523
(58) Field of Classification Search .................. 362/493, 362/286, 386, 271, 385, 418  
See application file for complete search history.

(56) References Cited

U.S. PATENT DOCUMENTS

| 2,738,492 | A | * | 3/1956 | Arneson et al. | 340/472 |
| 3,107,865 | A | * | 10/1963 | Hostetter | 362/493 |
| 3,264,607 | A | | 8/1966 | Sherman | 340/87 |
| 3,460,728 | A | * | 8/1969 | Adamson | 362/549 |
| 3,783,267 | A | * | 1/1974 | Thomas | 362/523 |
| 4,081,788 | A | | 3/1978 | Gaspar | 340/87 |
| 4,413,451 | A | | 11/1983 | Featherstone et al. | 52/28 |
| 5,558,424 | A | | 9/1996 | Zeligson | 362/66 |
| 6,067,012 | A | | 5/2000 | Harding | 340/472 |
| 2003/0095411 | A1 | * | 5/2003 | Blackwelder | 362/385 |

FOREIGN PATENT DOCUMENTS

| DE | 200 17 751 U1 | 1/2001 |
| EP | 788926 A2 * | 8/1997 |
| EP | 0864463 A2 | 3/1998 |

* cited by examiner

*Primary Examiner*—Jong-Suk (James) Lee  
*Assistant Examiner*—Kevin Spinella  
(74) *Attorney, Agent, or Firm*—Edwin D. Schindler

(57) ABSTRACT

A retractable lighting apparatus for the upper surface of a roof of a vehicle includes at least one lighting member adapted to be raised or lowered relative to the upper surface of the roof, and a device for effecting the raising and lowering of the lighting apparatus. The lighting apparatus has its own upper surface and a base component into which at least one telescopic component can be retracted.

8 Claims, 3 Drawing Sheets

RETRACTABLE TELESCOPING LIGHTING DEVICE FOR ROOF OF A VEHICLE

TECHNICAL AREA

Figure 1:
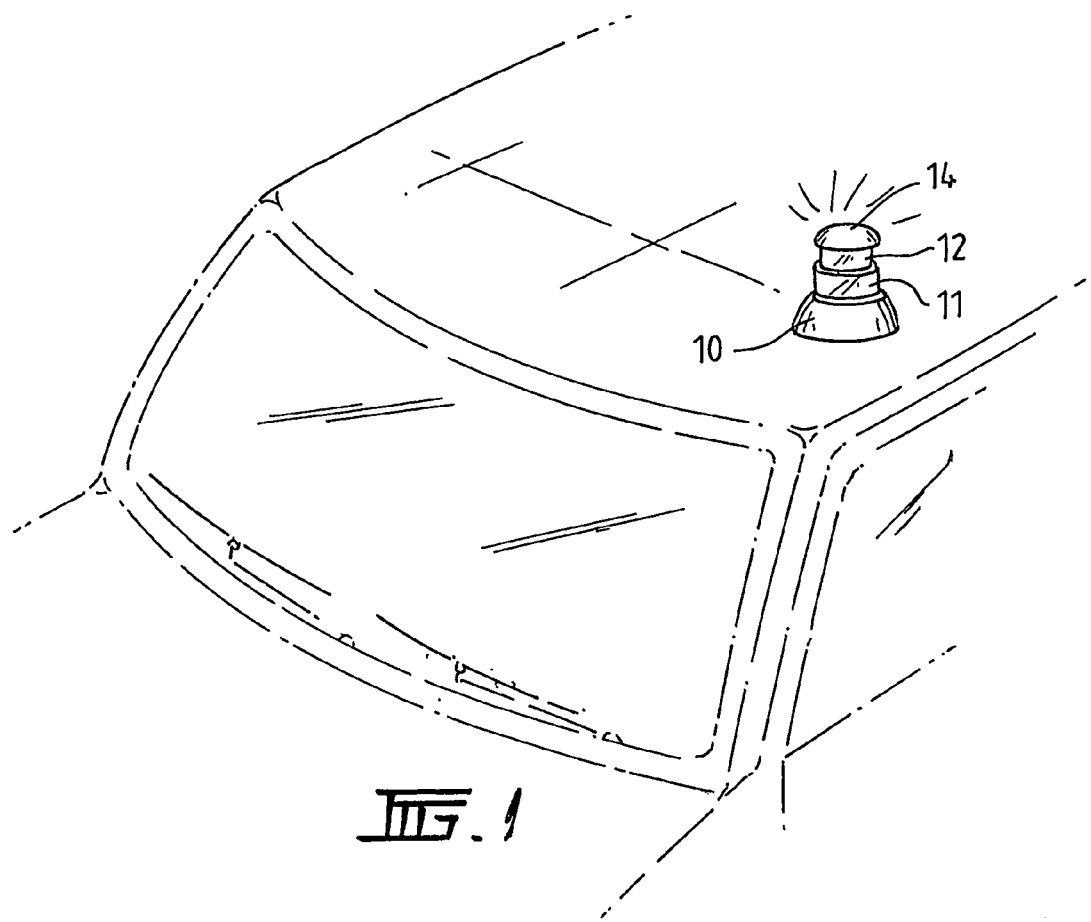

This invention relates to the area of lighting devices such as lamps or other illuminating devices and in particular to lighting devices which can be used to indicate emergency conditions or act as warning lights or the like.

BACKGROUND TO THE INVENTION

There are many applications of the lighting system of the invention however for convenience sake it will be discussed here in relation to emergency and warning lights.

Many vehicles and other objects use light signals to indicate their presence or to provide hazard warnings. In particular most emergency vehicles have an array of sirens and emergency lighting mounted on their roofs. These assemblies are generally large and bulky and provide significant increased drag to a vehicle thereby impeding both performance, handling and fuel efficiency.

Many vehicles, such as unmarked vehicles used by police, have a requirement that any warning or other lighting used to identify the vehicle be otherwise hidden when not in use. This is usually achieved by using removable sirens and flashing lights and locating them on a vehicle roof when required. Clearly this is a clumsy procedure.

Marine vessels too are required to carry lights at night for navigation safety purposes however these generally have to be mounted so that they are not only constantly exposed to the elements but can be easily damaged by contact with berthing facilities and the like.

OUTLINE OF THE INVENTION

It is an object of this invention to provide a low profile lighting system for use as warning, emergency and other such lighting which can be stored when not in use and easily displayed when required.

The invention is a retractable light system for a vehicle having a roof surface, said system having at least one light member adapted to be raised or lowered relative to the roof surface, and being provided with means to effect such raising or lowering.

It may be preferred that the light system of the invention be set into a vehicle roof. It may also be preferred that the invention include a mounting frame for the lighting system, said frame being adapted to engage with a vehicle roof.

The light system may have a single light member or a plurality of light members.

The lighting system may be activated by any means however it is preferred that it have a power source derived from the vehicle's power supply.

It may also be preferred that the lighting members be arrays of LED's however any type of lighting elements may be used including incandescent lighting and the like.

It is further preferred that the light members be provided with either one colour or a plurality of colours. It is also envisaged that individual retractable members may contain other objects such as electronic sirens, surveillance cameras or radar sensors as required for any given application.

In order that the invention may be more readily understood we shall describe by way of non limiting example several specific embodiments thereof with reference to the accompanying drawings.

BRIEF DESCRIPTION OF THE DRAWING FIGURES

Figures 2, 3:
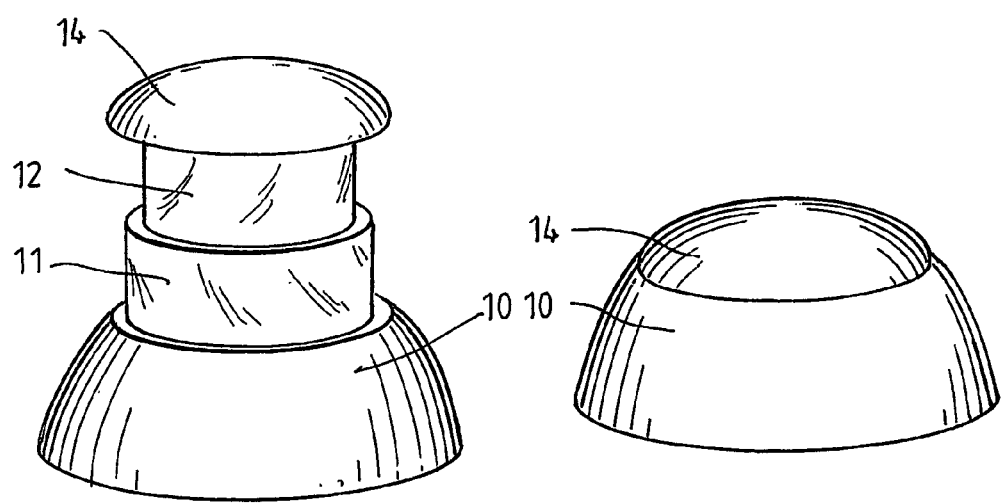
Figure 4:
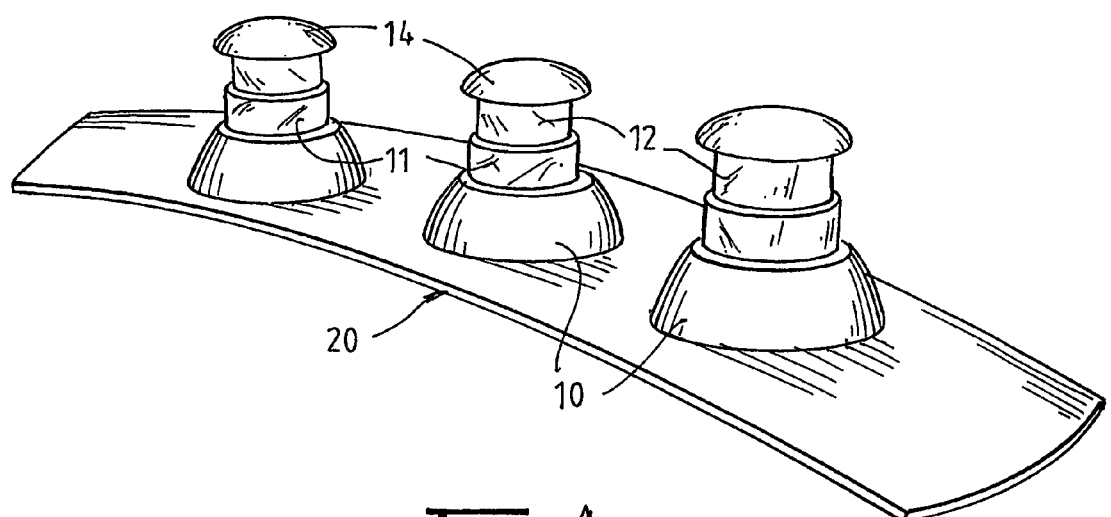
Figure 5:
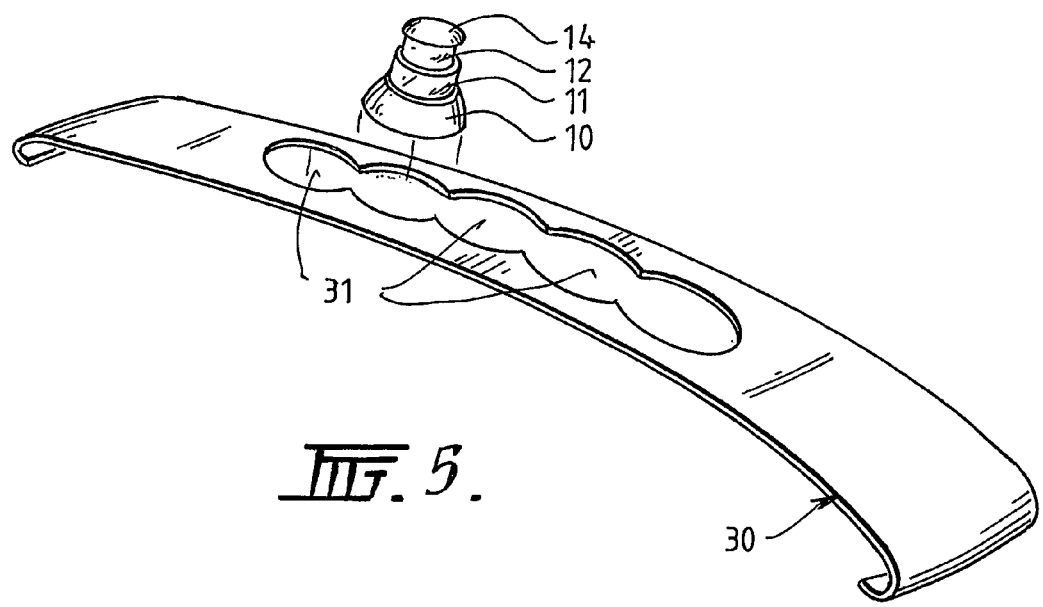
Figure 6:
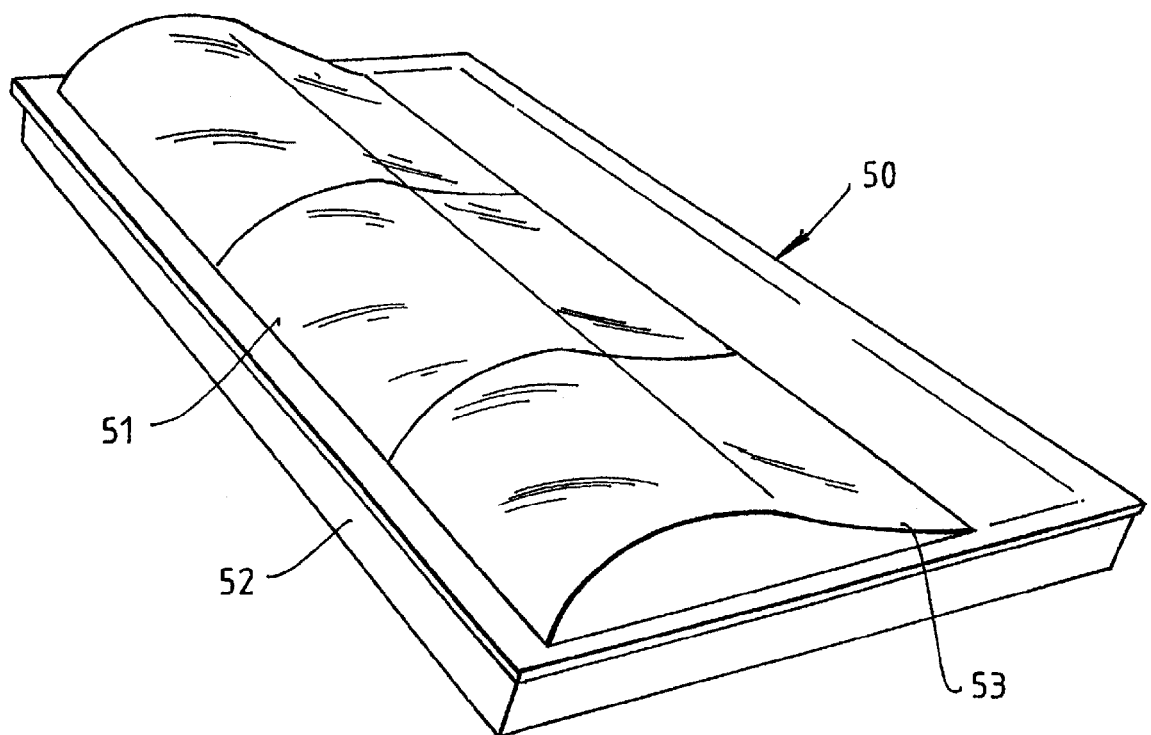
Figure 7A:
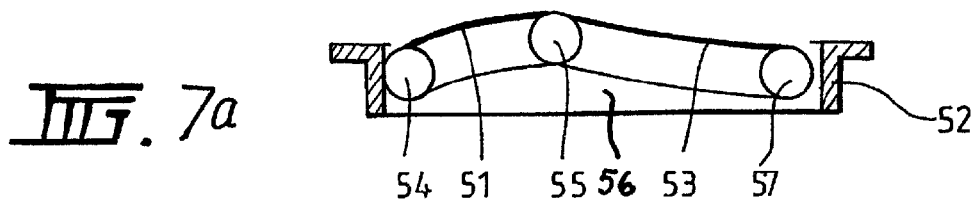
Figure 7B:
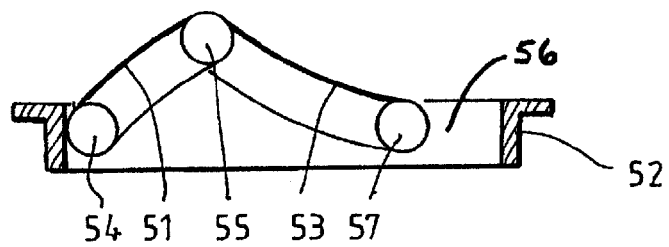
Figure 7C:
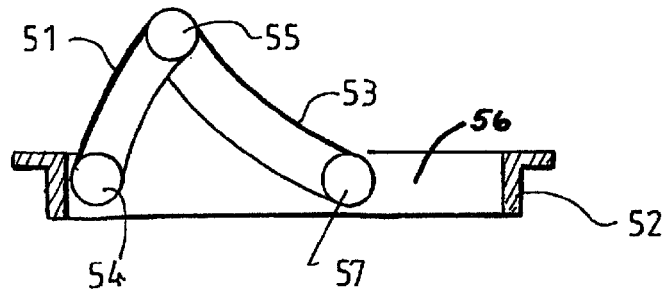

FIG. 1 is a diagram of a roof mounted single light member;
FIG. 2 shows a perspective view of a telescopic light member in its open position;
FIG. 3 shows the light member of FIG. 2 in its closed position;
FIG. 4 shows a plurality of light members mounted on a base member;
FIG. 5 shows a base member having a plurality of mounting points;
FIG. 6 shows a light member extending laterally across a vehicle roof;
FIG. 7 shows the configurations of the light member of FIG. 6;

DESCRIPTION OF PREFERRED EMBODIMENTS OF THE INVENTION

A preferred embodiment of the invention is shown in FIGS. 1, 2 and 3 and is a light member for use on a vehicle roof which is a retractable telescopic "pod" type design. The light member includes a generally circular base section 10 into which a central portion 11 can retract. The central portion 11 is hollow and adapted to accommodate upper portion 12 when in its closed position. An upper cover 14 is provided to protect the light member from the effects of weather, its precise shape however is not restricted in the invention.

FIG. 3 shows the telescopic light member when it is fully retracted such that only the base member 10 and cover 14 are visible.

In the embodiment of the invention shown each of the central 11 and upper 12 portions of the light member are formed with concentric circular walls flanged at their lower periphery to engage within the lower portion. LED's are mounted within the concentric walls to replicate rotating luminescent beacons although it is envisaged that in another embodiment of the invention an actual rotating light source could be located within a similarly shaped retractable structure.

In this embodiment of the invention it is preferred that the light member be bolted or otherwise attached directly to the roof of a vehicle although it could be set actually into the roof. The means whereby the devices extend and retract can include electrical, pneumatic or mechanical means. The effect however is that by using a retractable light system the vehicle drag is significantly reduced when the light member is not required to be in use. This is particularly relevant where a plurality of light members are to be used on a vehicle roof.

In a second embodiment of the invention as shown in FIG. 4 the light members may be mounted on a bearer device 20 passing generally laterally over a vehicle roof. This device 20 is preferably either flush with or close to flush with the roof of the vehicle and could take the form of a frame supported above the roof or a mat device fixed perhaps to a vehicle door frame at either side 30 thereof.

It is preferred that a plurality of seat members 31 be provided in the bearer device 20 and that the light members be able to be removeably located in these seat members such that they can be located wherever desired on the roof. The bearer device or support structure therefore effectively provides a plurality of "docking ports" to enable quick fit installation of the telescopic light members while it obtains its power supply from that of the vehicle itself. It is however envisaged that solar cells could be incorporated into the light members or the bearer device to supplement available power. It is also envisaged that sirens and the like could also be incorporated.

In a further embodiment of the invention as shown in FIGS. 6 and 7 a generally transverse light member is provided which is located in a sunroof location or similar aperture.

The light member is housed in a frame 52 having an upper edge 50 and lateral channels 56 within which a trailing edge 57 of the light member may travel. FIG. 7(*a*) shows the light member when not in use. FIG. 7(*b*) shows it when activation has commenced while FIG. 7(*c*) shows the fully raised light member.

In this embodiment of the invention the light member has a gently curved leading edge 51, for reduced drag when not in use, which is hinged at 54 and 55 to permit the leading edge 51 and trailing edge 53 to assume a more vertical orientation when it is activated.

Each face of the upright structure contains banks of light sources (typically LED's) in cartridge sets which create light beacons which shine both fore and aft. The light sources are controlled to replicate luminescent rotating emergency lights. It is also envisaged that message displays could be incorporated into this embodiment of the invention.

While a preferred version of this embodiment of the invention is inlaid into the vehicle roof in a similar manner to a sun roof it is envisaged that it could be actually mounted upon or above the roof.

In another embodiment of the invention it is envisaged that a single transverse light member could be used rather than the two component embodiment described above and that it could have suitable light sources mounted on its fore and aft sides.

The lighting system of the invention has applications to vehicles such as emergency vehicles such as ambulances or to fire and police vehicles.

While the lighting system of the invention could be located on any surface of the vehicle it has been described herein in terms of a replacement for conventional roof mounted lighting systems.

It is envisaged that the lighting systems described could be retro fitted in a similar manner to retractable sun roofs although they could also be fitted when a vehicle was manufactured.

While it is preferred that the light system of the invention have a relatively shallow depth, for the reasons discussed above, it is envisaged that its depth be sufficient to enable it to incorporate devices other than the lighting elements such as sirens, surveillance cameras, radar and other such devices.

The invention is not restricted to emergency or police vehicles or to vehicles per se and it is envisaged that it could be used wherever it may be preferred that light fittings be recessed within a surface when not in use.

One such application is that of navigational lighting for marine vessels. This type of lighting is only required at night but is conventionally attached to bow pulpits and the like. It is therefore not only exposed to the sea but is also very vulnerable to damage during all manner of operations such as when a boat approaches a pier.

It is envisaged that navigation lights could be set flush with the sides of the bows of a boat or elsewhere, perhaps on the superstructure, such that they could extend outwardly from the surface in which they were mounted and illuminated when required for navigation purposes.

The concept of the invention has many applications in a large number of areas. In essence it provides a retractable lighting system wherever it is desired for aesthetic, safety or other reasons.

In particular, in relation to vehicles such as cars with emergency or hazard lighting, the feature of the invention of being able to retract the light source when it is not required thereby reducing aerodynamic drag by reducing both the overall vehicle height and surface roughness, in the case where conventional lighting sources are mounted on the roof, results in improved vehicle handling as well as a reduction in fuel usage.

Whilst we have described herein specific embodiments of the invention it is envisaged that other embodiments of the invention will exhibit any number of and any combination of the features previously described and it is to be understood that variations and modifications in this can be made without departing from the spirit and scope of the invention.

The claims defining the invention are as follows:

1. A retractable lighting apparatus for a vehicle having a vehicle roof, comprising:
   a light member having an internally located light source and a base component with said base component having a lower surface set on top of an upper surface of a roof of a vehicle;
   means for mounting said base component of said light member on said upper surface of the roof of the vehicle; and,
   means for raising and lowering said internally located light source of said light member, relative to the upper surface of the roof of the vehicle, between a first position, wherein said internally located light source is located within said base component of said light member, and a second position wherein said internally located light source is raised to a location above said base component, said retractable lighting apparatus being situated entirely above, and not extending below, the upper surface of the roof of the vehicle.

2. The retractable lighting apparatus for a vehicle having a vehicle roof according to claim 1, further comprising a telescopic component with said light member having said base component into which said telescopic component is retractable.

3. The retractable lighting apparatus for a vehicle having a vehicle roof according to claim 2, wherein said light member is located on an interior wall of said telescopic component.

4. The retractable lighting apparatus for a vehicle having a vehicle roof according to claim 2, wherein said light member includes a plurality of telescopic components.

5. The retractable lighting apparatus for a vehicle having a vehicle roof according to claim 1, wherein said light member extends laterally across said roof of said vehicle in said first position and said light member is substantially parallel to said roof of said vehicle said second position.

6. The retractable lighting apparatus for a vehicle having a vehicle roof according to claim 1, further comprising an auxiliary siren as part of said light member.

7. The retractable lighting apparatus for a vehicle having a vehicle roof according to claim 1, further comprising a radar sensor as part of said light member.

8. The retractable lighting apparatus for a vehicle having a vehicle roof according to claim 1, wherein said means for raising and lowering said light member is powered by an electrical source incorporated into said vehicle.

* * * * *